(12) United States Patent
Lee et al.

(10) Patent No.: US 9,991,781 B2
(45) Date of Patent: Jun. 5, 2018

(54) POWER SUPPLY AND DRIVING METHOD OF THE SAME

(71) Applicant: SAMSUNG DISPLAY CO., LTD., Yongin, Gyeonggi-do (KR)

(72) Inventors: Sang Hyun Lee, Yongin-si (KR); Moon Shik Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 10 days.

(21) Appl. No.: 15/132,485

(22) Filed: Apr. 19, 2016

(65) Prior Publication Data
US 2017/0054370 A1 Feb. 23, 2017

(30) Foreign Application Priority Data
Aug. 18, 2015 (KR) .................. 10-2015-0115968

(51) Int. Cl.
*H02M 1/15* (2006.01)
*H02M 3/156* (2006.01)
*H02M 3/335* (2006.01)
*H02M 1/00* (2006.01)

(52) U.S. Cl.
CPC ............ *H02M 1/15* (2013.01); *H02M 3/156* (2013.01); *H02M 3/33507* (2013.01); *H02M 2001/0009* (2013.01)

(58) Field of Classification Search
CPC ............ H02M 1/12; H02M 1/14; H02M 1/15; H02M 2001/009; H02M 2001/0019; H02J 3/01
See application file for complete search history.

(56) References Cited

U.S. PATENT DOCUMENTS

| | | | | |
|---|---|---|---|---|
| 4,630,001 A * | 12/1986 | Komorowski | ............ | H03J 7/02 331/1 A |
| 6,301,135 B1 * | 10/2001 | Mammano | ........ | H02M 3/33523 363/132 |
| 6,680,604 B2 * | 1/2004 | Muratov | .................... | G06F 1/26 323/283 |
| 7,408,268 B1 * | 8/2008 | Nocentini | ................ | H02J 3/38 307/16 |
| 7,872,454 B2 * | 1/2011 | Sutardja | ................ | H02M 3/157 323/222 |
| 8,259,472 B2 * | 9/2012 | Li | ..................... | H02M 3/33507 363/21.12 |
| 8,878,505 B2 * | 11/2014 | Temkin | ............. | H02M 3/33523 323/282 |

(Continued)

OTHER PUBLICATIONS

J. Garcia et al., Low Ripple Interleaved Converter for Fast PWM Dimming of Power LEDs, Article, 2010, pp. 915-920, IEEE.

*Primary Examiner* — Kyle J Moody
(74) *Attorney, Agent, or Firm* — Cantor Colburn LLP (57) ABSTRACT

A power supply includes a direct current to direct current converter that includes at least one switching element and that converts an externally supplied input voltage to an output voltage and then supplies the output voltage to a load, a current sensor that detects a frequency of a load current by sensing the load current, and a switching controller that sets a switching frequency corresponding to the frequency of the load current and that controls an operation of the at least one switching element according to the set switching frequency.

11 Claims, 5 Drawing Sheets

(56) References Cited

U.S. PATENT DOCUMENTS

| | | | | |
|---|---|---|---|---|
| 8,885,364 | B2* | 11/2014 | Wang | H02M 3/33523 |
| | | | | 363/21.15 |
| 9,270,186 | B2* | 2/2016 | Lee | H02M 3/33523 |
| 2009/0276639 | A1* | 11/2009 | Saha | H02M 3/156 |
| | | | | 713/300 |
| 2012/0154013 | A1* | 6/2012 | Mera | G11C 11/4074 |
| | | | | 327/333 |
| 2014/0117878 | A1* | 5/2014 | Prodic | H05B 33/0815 |
| | | | | 315/307 |
| 2014/0327421 | A1* | 11/2014 | Arao | H02M 3/156 |
| | | | | 323/282 |
| 2015/0054417 | A1 | 2/2015 | Lee | |
| 2015/0257230 | A1* | 9/2015 | Lee | H05B 33/0851 |
| | | | | 315/186 |
| 2017/0012529 | A1* | 1/2017 | Yamada | H02M 3/158 |

* cited by examiner

POWER SUPPLY AND DRIVING METHOD OF THE SAME

This application claims priority to Korean Patent Application No. 10-2015-0115968, filed on Aug. 18, 2015, and all the benefits accruing therefrom under 35 U.S.C. § 119, the content of which in its entirety is herein incorporated by reference.

BACKGROUND (a) Field

Exemplary embodiments of the invention relate to a power supply and a driving method of the same.

(b) Description of the Related Art

Various kinds of display devices that reduce disadvantages of cathode ray tubes ("CRT"), such as a heavy weight and a large size, have been developed in recent years. Such display devices include a liquid crystal display device, a field emission display device, a plasma display device, and an organic light emitting display device, for example.

A display device generally includes a power supply that generates a needed voltage for driving the display device by converting an externally supplied voltage.

SUMMARY

In a structure of a display device including a power supply, when an output voltage from the power supply has an excessive ripple frequency, the display device malfunctions by the ripple frequency, and may display abnormally distorted images.

The invention has been made in an effort to provide a power supply capable of minimizing a ripple frequency of an output voltage, and a driving method of the same.

A power supply according to an exemplary embodiment of the invention may include a direct current to direct current ("DC-DC") converter that includes at least one switching element and that converts an externally supplied input voltage to an output voltage and then supplies the output voltage to a load, a current sensor that detects a frequency of a load current by sensing the load current, and a switching controller that sets a switching frequency corresponding to the frequency of the load current and that controls an operation of the at least one switching element according to the set switching frequency.

In an exemplary embodiment, the switching frequency may be the same as the frequency of the load current.

In an exemplary embodiment, the switching frequency may be set to have a value obtained by multiplying the frequency of the load current by 1/n ("n" is a natural number equal to or greater than 2).

In an exemplary embodiment, the switching controller may supply a switching control signal having the switching frequency to the at least one switching element.

In an exemplary embodiment, a transition time of the switching control signal may correspond to that of the load current.

In an exemplary embodiment, the DC-DC converter may be a non-insulation type converter.

In an exemplary embodiment, the DC-DC converter may include at least one of a boost converter, a buck converter, and a buck-boost converter.

In an exemplary embodiment, the DC-DC converter may include an insulation type converter.

In an exemplary embodiment, the DC-DC converter may include a half-bridge converter.

A method for driving a power supply according to another exemplary embodiment of the may include detecting a frequency of a load current, setting a switching frequency corresponding to the frequency of the load current, and controlling a switching element by supplying a switching control signal having the switching frequency to the switching element included in a DC-DC converter.

In an exemplary embodiment, the switching frequency may be the same as the frequency of the load current.

In an exemplary embodiment, the switching frequency may be set to have a value obtained by multiplying the frequency of the load current by 1/n ("n" is a natural number equal to or greater than 2).

In an exemplary embodiment, a transition time of the switching control signal may correspond to that of the load current.

According to the exemplary embodiments of the invention, the power supply capable of minimizing the ripple frequency of the output voltage by utilizing the switching frequency synchronized with the frequency of the load current, and the driving method of such a power supply are provided.

Exemplary embodiments will now be described more fully hereinafter with reference to the accompanying drawings, but they may be embodied in different forms and should not be construed as limited to the embodiments set forth herein. Rather, these embodiments are provided so that this disclosure will be thorough and complete and will fully convey the scope of the exemplary embodiments to those skilled in the art. In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

DETAILED DESCRIPTION

The detailed matters of the exemplary embodiments will be included in the detailed description and the drawings.

The advantages and features of the invention and a method of achieving them will be made clear by referring to the exemplary embodiments described below in detail with reference to the accompanying drawings. However, the invention is not limited to the exemplary embodiments described below and may be implemented in various ways.

Throughout this specification and the claims that follow, when it is described that an element is "coupled" to another element, the element may be "directly coupled" to the other element or "indirectly coupled" to the other element through a third element.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

The drawings and description are to be regarded as illustrative in nature and not restrictive, and like reference numerals designate like elements throughout the specification.

The invention will be described more fully hereinafter with reference to the accompanying drawings, in which exemplary embodiments of the invention are shown.

Figure 1:
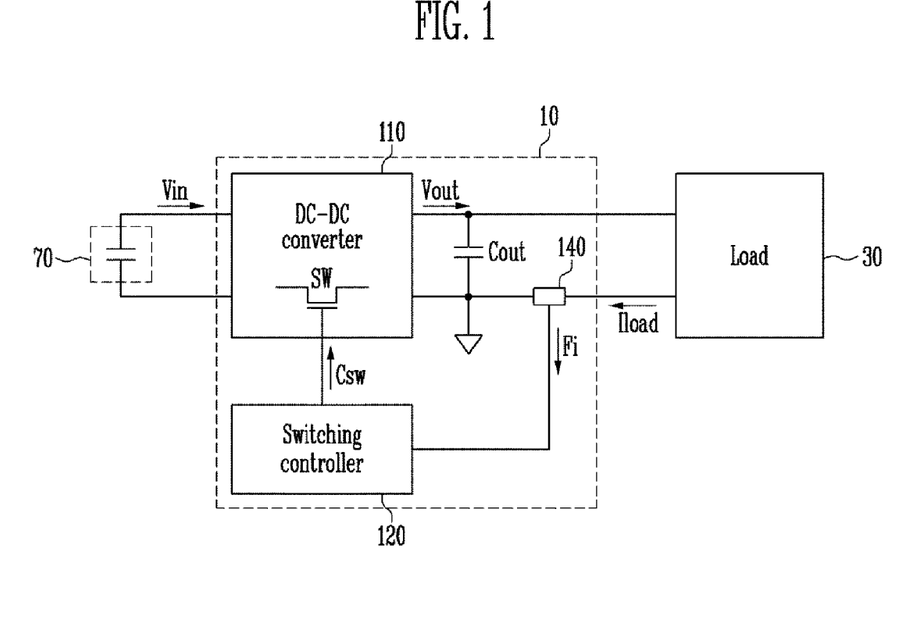
FIG. 1 is a view of an exemplary embodiment of a power supply according to the invention.

FIG. 1 is a view of a power supply according to an exemplary embodiment of the invention.

Referring to FIG. 1, the power supply 10 according to the exemplary embodiment of the invention may include a direct current to direct current ("DC-DC") converter 110, a switching controller 120, and a current sensor 140.

The DC-DC converter 110 may convert an externally supplied input voltage Vin to an output voltage Vout, and may supply the output voltage Vout to a load 30.

To perform the above-mentioned operations, the DC-DC converter 110 may include at least one switching element SW.

The switching element SW may be controlled by a switching control signal Csw supplied from the switching controller 120.

In an exemplary embodiment, the switching element SW may perform a switching operation (a turn-on or turn-off operation) in response to the switching control signal Csw, for example.

The switching element SW may be implemented with a transistor.

In an exemplary embodiment, the switching element SW may be turned on in response to the switching control signal Csw of a high level, and turned off in response to the switching control signal Csw of a low level, for example.

In contrast, the switching element SW may be turned on in response to the switching control signal Csw of a low level, and turned off in response to the switching control signal Csw of a high level.

The DC-DC converter 110 may be implemented with various types of converters, each of which includes at least one switching element SW.

A structure of the DC-DC converter 110 will be described later in more detail with reference to FIGS. 2A to 2C and 3.

The power supply 70 may supply the input voltage Vin to the DC-DC converter 110. In an exemplary embodiment, the power supply 70 may be a battery which supplies alternating current, or a rectifier which converts alternating current to direct current, for example. However, the invention is not limited thereto, and the power supply 70 may include various other types of power supplies.

An output terminal of the DC-DC converter 110 may be connected to an output capacitor Cout in order to maintain the output voltage Vout.

The load 30 may be supplied with the output voltage Vout, and may perform a specific function using the output voltage Vout.

This load 30 may be a display panel for displaying an image, or a load of which a load state varies periodically. In other words, the load 30 may periodically repeat a light load state and a heavy load state according to a specific frequency.

Since the state of the load 30 varies according to the specific frequency, a load current Iload may periodically repeat a high level state and a low level state according to the specific frequency.

Thus, the load current Iload may have a specific frequency Fi according to a variation of the load state.

In this case, the load current Iload may be defined as a current to be supplied to the load 30, or a current flowing through the load 30.

The current sensor 140 may detect the frequency Fi of the load current Iload by sensing the load current Iload.

In addition, the current sensor 140 may supply the detected frequency Fi of the load current Iload to the switching controller 120.

The switching controller 120 may receive the frequency Fi of the load current Iload from the current sensor 140, and may set a switching frequency corresponding to the frequency Fi of the load Iload.

In addition, the switching controller 120 may control an operation of the switching element SW according to the switching frequency.

In an exemplary embodiment, the switching controller 120 may supply the switching control signal Csw with the set switching frequency to the switching element SW included in the DC-DC converter 110, for example.

Thus, the switching element SW of the DC-DC converter 110 may perform a turn-on or turn-off operation according to the switching frequency.

The switching frequency set by the switching controller 120 may be set to be equal to or lower than the frequency Fi of the load current Iload.

In an exemplary embodiment, the switching frequency may have a value equal to the frequency Fi of the load current Iload, or a value obtained by multiplying the frequency Fi of the load current Iload by 1/n ("n" is a natural number equal to or greater than 2), for example.

Accordingly, the switching control signal Csw and the load current Iload may have the same frequency, or the switching control signal Csw may have a frequency obtained by multiplying the frequency Fi of the load current Iload by 1/n.

The operation of the switching controller 120 will be described later in more detail with reference to FIGS. 4 to 6.

Figure 2A:
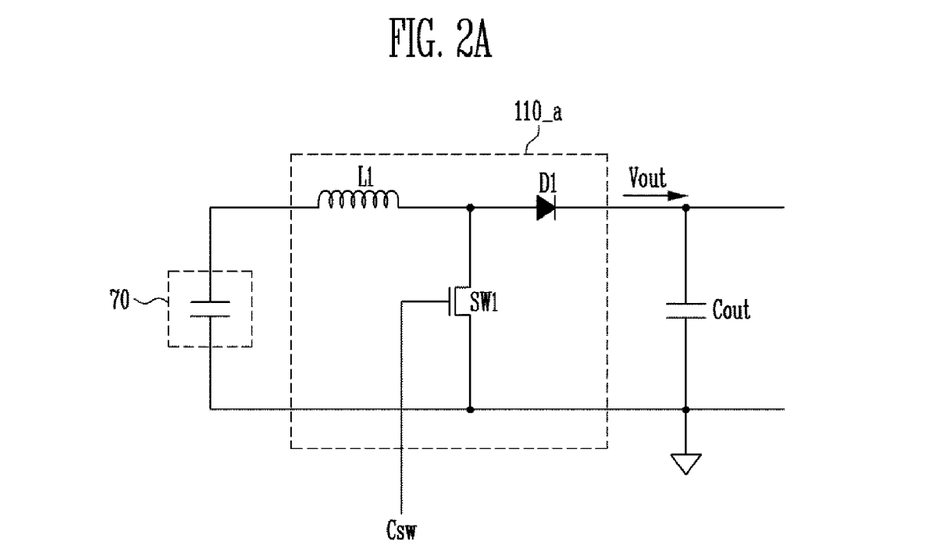
FIGS. 2A to 2C show exemplary embodiments of non-insulation type converters applicable to the direct current to direct current ("DC-DC") converter shown in FIG. 1.
Figure 2B:
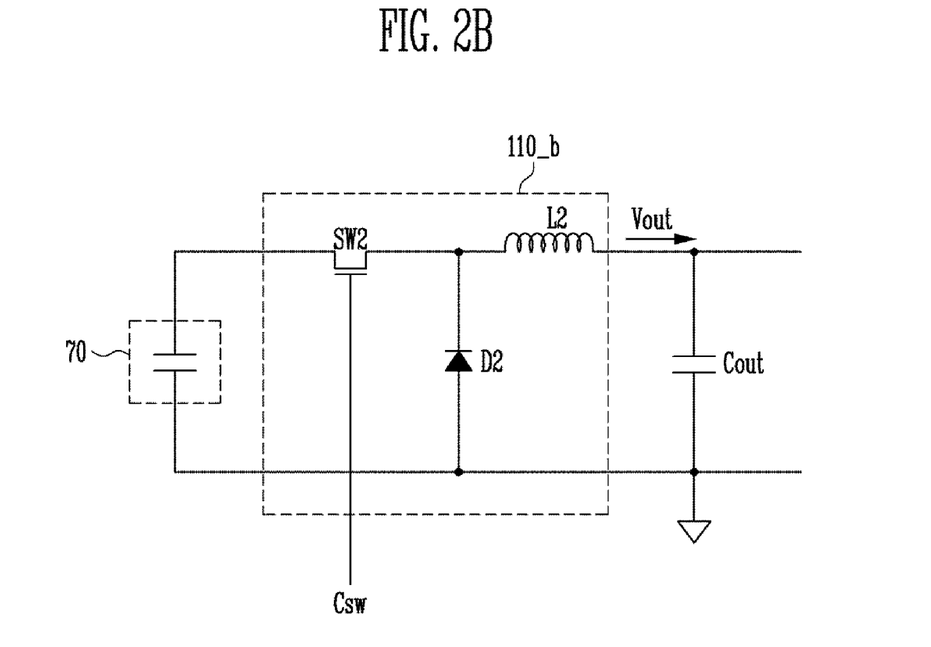
Figure 2C:
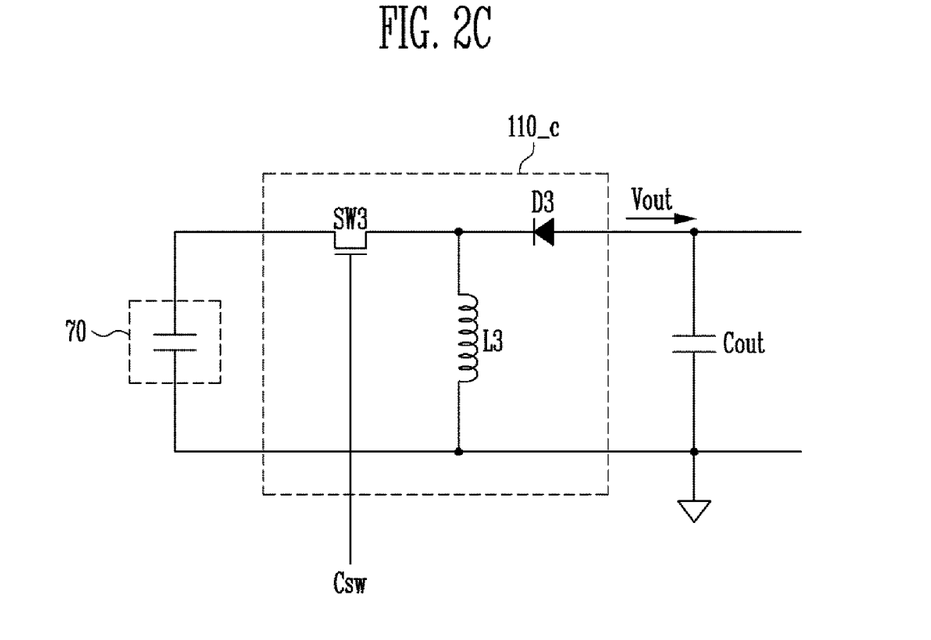
Figure 3:
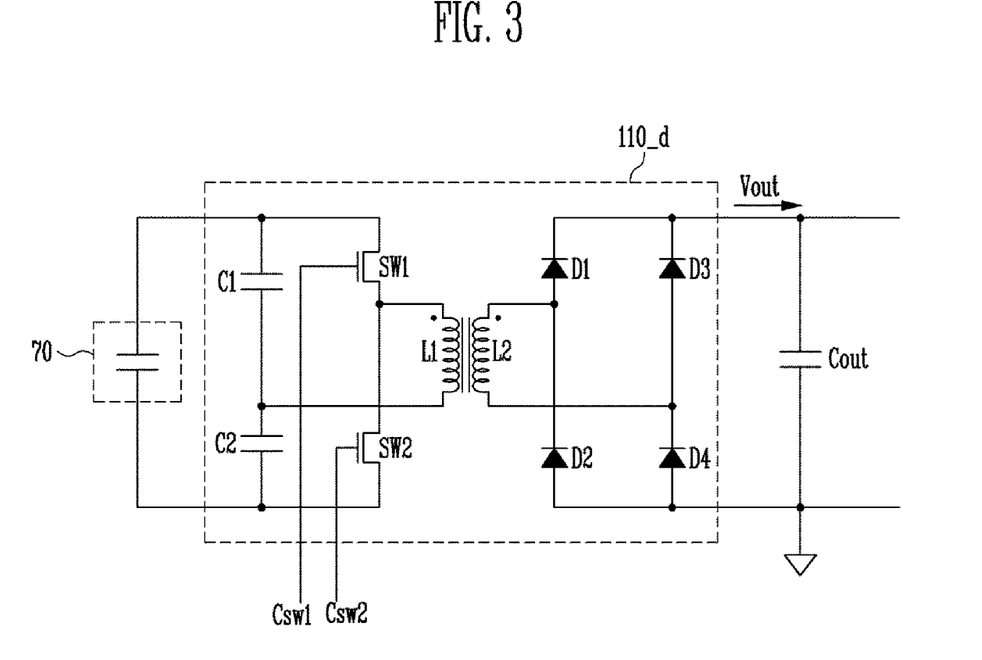
FIG. 3 shows an insulation type converter applicable to the DC-DC converter shown in FIG. 1.

FIGS. 2A to 2C show various forms of non-insulation type converters applicable to the DC-DC converter shown in FIG. 1, and FIG. 3 shows an insulation type converter applicable to the DC-DC converter shown in FIG. 1.

The DC-DC converter 110 according to the exemplary embodiment of the invention may be implemented with any one of the non-insulation type converters 110_a, 110_b, and 110_c.

Referring to FIG. 2A, the DC-DC converter 110_a according to an exemplary embodiment of the invention may be a boost converter including a switching element SW1, an inductor L1, and a diode D1.

In this case, the turn-on or turn-off operation of the switching element SW1 may be controlled by the switching control signal Csw, and the switching element SW1 may be the implemented with a transistor.

Referring to FIG. 2B, the DC-DC converter 110_b according to another exemplary embodiment of the invention may be a buck converter including a switching element SW2, an inductor L2, and a diode D2.

In this case, the turn-on or turn-off operation of the switching element SW2 may be controlled by the switching control signal Csw, and the switching element SW2 may be the implemented with a transistor.

Referring to FIG. 2C, the DC-DC converter 110_c according to another exemplary embodiment of the invention may be a buck-boost converter including a switching element SW3, an inductor L3, and a diode D3.

In this case, the turn-on or turn-off operation of the switching element SW3 may be controlled by the switching control signal Csw, and the switching element SW3 may be the implemented with a transistor.

The DC-DC converter 110 applicable to the invention is not limited to ones of three embodiments described above, and various forms of non-insulation type converters may be applicable to the invention.

The DC-DC converter 110 according to the exemplary embodiment of the invention may be implemented with an insulation type converter 110_d shown in FIG. 3.

Referring to FIG. 3, the DC-DC converter 110_d according to another exemplary embodiment of the invention may be a half-bridge converter including two switching elements SW1 and SW2, two inductors L1 and L2, four diodes D1, D2, D3, and D4, and two capacitors C1 and C2.

In this case, the turn-on or turn-off operation of the switching elements SW1 and SW2 may be controlled by switching control signals Csw1 and Csw2, and the switching elements SW1 and SW2 may be the implemented with transistors.

The DC-DC converter 110 applicable to the invention is not limited to ones of the embodiments described above, and various forms of insulation type converters may be used. In an exemplary embodiment, various types of converters such as a full-bridge converter, a push-pull converter, a flyback converter, a forward converter, and so forth may be applicable to the exemplary embodiments of the invention.

Figure 4:
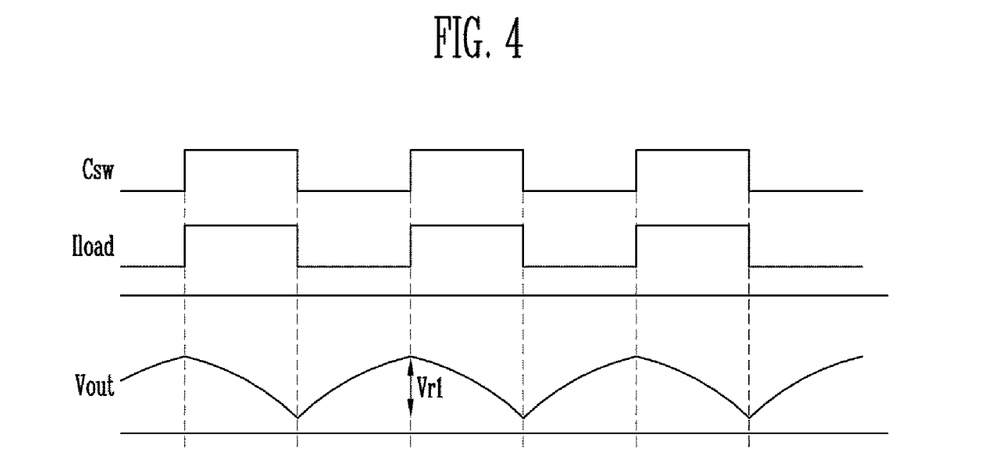
FIG. 4 shows waveforms for describing an operation of an exemplary embodiment of a power supply according to the invention.

FIG. 4 shows waveforms for describing an operation of a power supply according to an exemplary embodiment of the invention.

Referring to FIG. 4, the switching control signal Csw according to the exemplary embodiment of the invention may have the same frequency as that of the load current Iload.

In addition, the transition time of the switching control signal Csw may correspond to that of the load current Iload.

In an exemplary embodiment, rising edges of the switching control signal Csw may correspond to those of the load current Iload, and falling edges of the switching control signal Csw may correspond to those of the load current Iload, for example.

Figure 8:
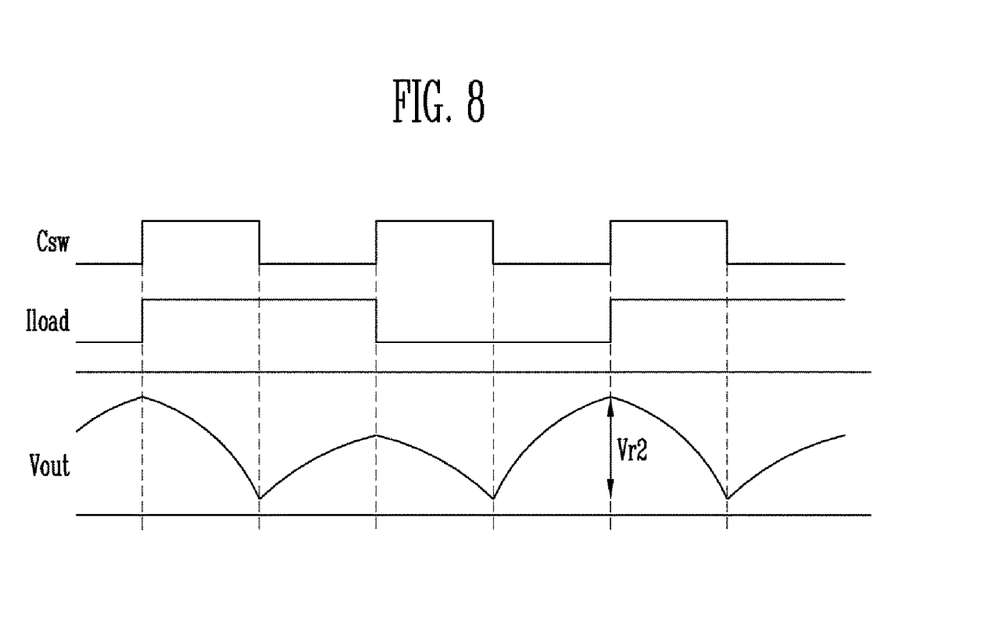
FIG. 8 shows waveforms of a comparative example for comparing with the exemplary embodiment of the invention.

FIG. 8 shows waveforms of a comparative example for comparing with the exemplary embodiment of the invention. The comparative example deals with the switching signal Csw whose frequency is twice that of the load current Iload.

In the case in which the frequency of the switching control signal Csw is faster than that of the load current Iload as shown in FIG. 8, since the on and off variations of the switching element SW continue even during each load period, a ripple Vr2 of the output voltage Vout become remarkably bigger by the on and off variations of the switching element SW.

In the exemplary embodiment of the invention, only a turn-on period or turn-off period of the switching element SW is maintained during each load period. In other words, the switching element SW may be maintained in a constant state (that is, any one of a turn-on state and a turn-off state) during each load period.

Thus, the ripple of the output voltage Vout caused by the on and off variations of the switching element SW during each load period is removed, and a ripple Vr1 smaller than the ripple Vr2 of the comparative example remains as shown in FIG. 4.

Figure 5:
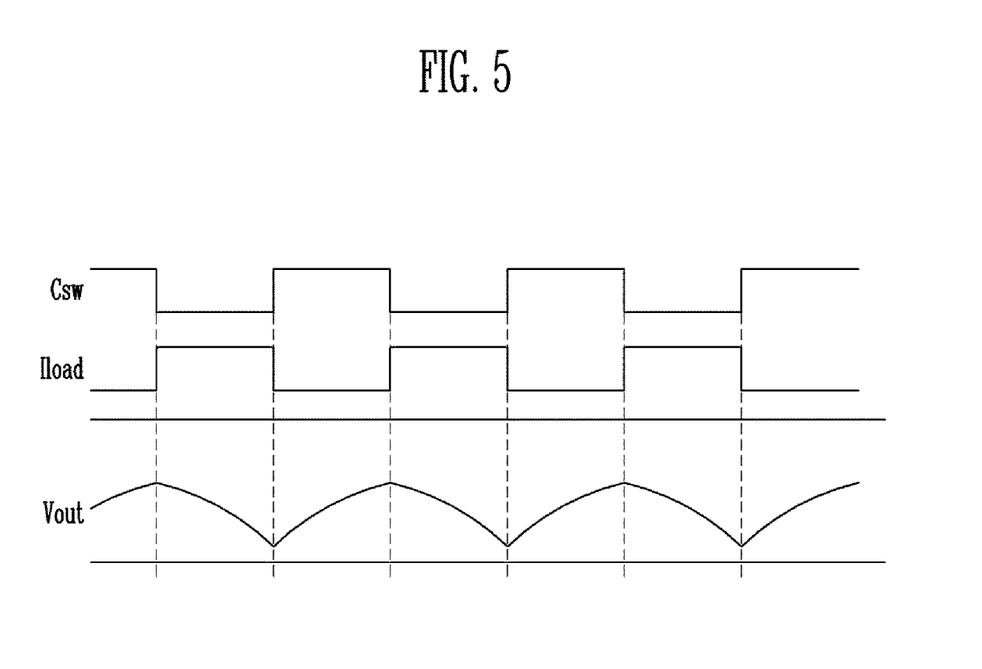
FIG. 5 shows waveforms for describing an operation of another exemplary embodiment of a power supply according to the invention.

FIG. 5 shows waveforms for describing an operation of a power supply according to another exemplary embodiment of the invention.

Referring to FIG. 4, the switching control signal Csw according to another exemplary embodiment of the invention may have the same frequency as that of the load current Iload.

In addition, the transition time of the switching control signal Csw may correspond to that of the load current Iload.

However, differently from FIG. 4, falling edges of the switching control signal Csw may correspond to rising edges of the load current Iload, and rising edges of the switching control signal Csw may correspond to falling edges of the load current Iload.

In the exemplary embodiment like the foregoing embodiment, the ripple of the output voltage Vout caused by the on and off variations of the switching element SW during each load period is removed, and a ripple smaller than the ripple Vr2 of the comparative example remains.

Figure 6:
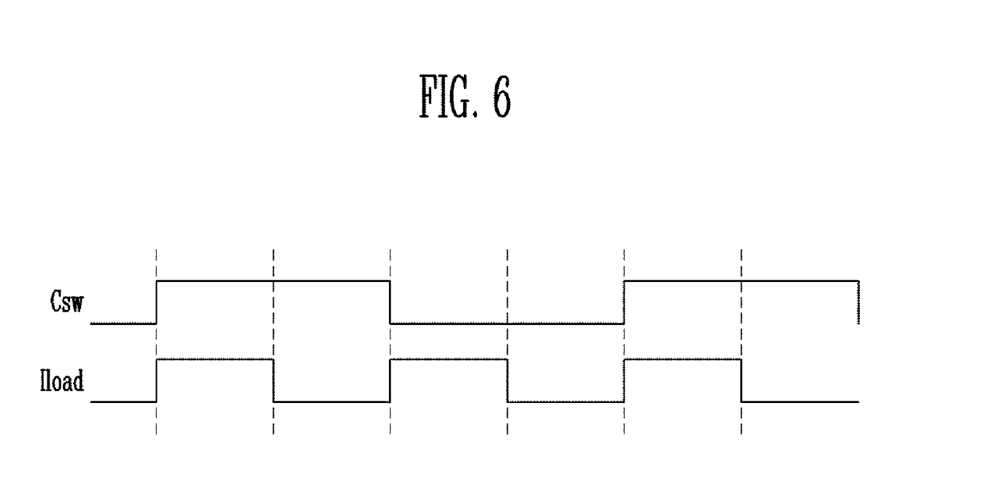
FIG. 6 shows waveforms for describing an operation of another exemplary embodiment of a power supply according to the invention.

FIG. 6 shows waveforms for describing an operation of a power supply according to another exemplary embodiment of the invention.

Referring to FIG. 6, the switching control signal Csw according to another exemplary embodiment of the invention may have a frequency lower than that of the load current Iload.

In an exemplary embodiment, the frequency of the switching control signal Csw may be set to have a value obtained by multiplying the frequency Fi of the load current Iload by 1/n ("n" is a natural number equal to or greater than 2), for example.

In particular, in FIG. 6, the frequency of the switching control signal Csw has a value obtained by multiplying the frequency Fi of the load current Iload by ½.

In addition, the transition time of the switching control signal Csw may correspond to that of the load current Iload. However, differently from FIG. 4, all of the rising edges and falling edges of the switching control signal Csw may correspond to the rising edges of the load current Iload.

In the exemplary embodiment like the foregoing embodiments, the ripple of the output voltage Vout caused by the on and off variations of the switching element SW during each load period is removed, and a ripple smaller than the ripple Vr2 of the comparative example remains.

Figure 7:
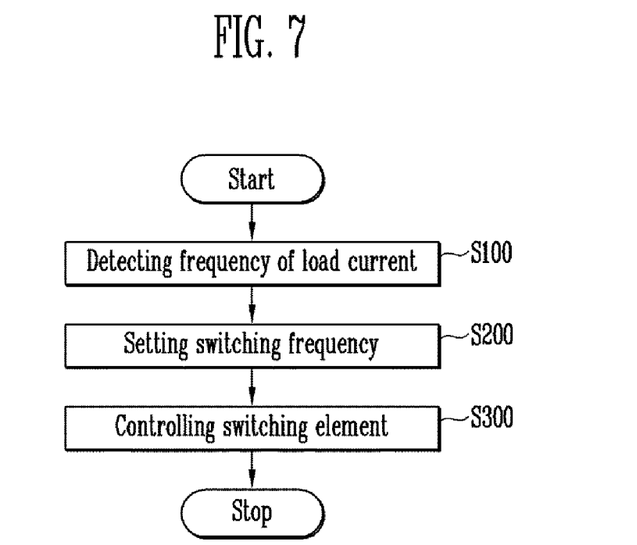
FIG. 7 is a flowchart for describing the exemplary embodiment of a driving method of the power supply according to the invention.

FIG. 7 is a flowchart for describing a driving method of the power supply according to the exemplary embodiment of the invention.

Referring to FIGS. 1 and 7, the method of driving the power supply according to the exemplary embodiment of the invention may include detecting the frequency Fi of the load current Iload at an operation S100, setting the switching frequency at an operation S200, and controlling the switching element SW at an operation 300.

In detail, at the operation S100, the frequency Fi of the load current Iload may be detected by sensing the load current Iload. The above described operation may be performed by the current sensor 140.

At the operation S200, the switching frequency may be set to correspond to the frequency Fi of the load current Iload detected at the previous operation S100. The above described operation may be performed by the switching controller 120. The switching controller 120 may receive the frequency Fi of the load current Iload from the current sensor 140, and may set the switching frequency to correspond to frequency Fi of the load current Iload.

Next, at the operation S300, the switching control signal Csw having the switching frequency set at the previous operation S200 is generated, and supplied to the switching element SW included in the DC-DC converter 110, thereby controlling the switching element SW. The above described operation may be performed by the switching controller 120.

Exemplary embodiments have been disclosed herein and although specific terms are employed, they are used and are to be interpreted in a generic and descriptive sense only and not for purpose of limitation. In some examples, as would be apparent to one of ordinary skill in the art as of the filing of the application, features, characteristics and/or elements described in connection with a particular embodiment may be used singly or in combination with features, characteristics and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A power supply comprising:
    a direct current to direct current converter which includes at least one switching element and which converts an externally supplied input voltage to an output voltage and then supplies the output voltage to a load;
    a current sensor which is directly connected to the load and detects a frequency of a load current by sensing the load current; and
    a switching controller which sets a switching frequency corresponding to the frequency of the load current and which controls an operation of the at least one switching element according to the switching frequency set by the switching controller,
    wherein the switching frequency is set to have a value obtained by multiplying the frequency of the load current by 1/n where 'n' is a natural number equal to or greater than 2.

2. The power supply of claim 1, wherein the switching frequency is the same as the frequency of the load current.

3. The power supply of claim 1, wherein the switching controller supplies a switching control signal having the switching frequency to the at least one switching element.

4. The power supply of claim 3, wherein a transition time of the switching control signal corresponds to that of the load current.

5. The power supply of claim 1, wherein the direct current to direct current converter includes a non-insulation type converter.

6. The power supply of claim 5, wherein the direct current to direct current converter includes at least one of a boost converter, a buck converter, and a buck-boost converter.

7. The power supply of claim 1, wherein the direct current to direct current converter includes an insulation type converter.

8. The power supply of claim 7, wherein the direct current to direct current converter includes a half-bridge converter.

9. A method for driving a power supply, comprising:
    detecting a frequency of a load current by a current sensor which is directly connected to the load; setting a switching frequency corresponding to the frequency of the load current; and controlling a switching element by supplying a switching control signal, having the switching frequency, to the switching element which is included in a direct current to direct current converter, wherein the switching frequency is set to have a value obtained by multiplying the frequency of the load current by 1/n where "n" is a natural number equal to or greater than 2.

10. The method of claim 9, wherein the switching frequency is the same as the frequency of the load current.

11. The method of claim 9, wherein a transition time of the switching control signal corresponds to that of the load current.

* * * * *